3,106,498
MANUFACTURE OF CASTING POWDER GRANULES
Michael A. Grable, Frostburg, Md., assignor to Hercules Powder Company, Wilmington, Del., a corporation of Delaware
No Drawing. Filed Mar. 25, 1958, Ser. No. 723,929
8 Claims. (Cl. 149—96)

This invention relates to an improvement in the art of manufacturing casting powder granules by the shock-gel process and, more particularly, relates to an improvement in the method of removing water from shock-gel casting powder granules.

The manufacture of casting powder granules by the shock-gel method involves initially preparing a solution of nitrocellulose, together with customary smokeless powder adjuvants such as stabilizers, plasticizers, and the like, in a water-miscible alkoxy alcohol, such as diethylene glycol, preforming the resulting nitrocellulose solution into the desired body shape, and then introducing the preformed nitrocellulose solution bodies into an aqueous bath containing up to 90% by weight of water-miscible alkoxy alcohol to gel the nitrocellulose. The surface of the preformed nitrocellulose solution bodies, upon contacting the aqueous bath, is immediately gelled at the instant of contact and a tough envelope of gelled nitrocellulose composition is formed about the exterior of the nitrocellulose body. For convenience, this phenomenon is termed "shock-gelling." This envelope of shock-gelled nitrocellulose composition is of sufficient toughness so that the body retains its preformed shape, and is also permeable to the passage of water into the body and the passage of alkoxy alcohol out of the body. The shock-gelled particles thus formed are then leached with water until the diethylene glycol or similar alkoxy alcohol contained within the particles is replaced with water. The particles may then contain up to 95% water by weight, and the gelled material at conclusion of the leaching process is thus a highly swollen attenuated gel, somewhat rubbery and elastic in behavior. For convenience, the gelled material upon completion of leaching is termed "water-logged." The conventional method for removing water from the water-logged particles is by evaporation. The water-logged particles, contained in cloth bottom trays or other suitable containers, are placed in an air heated oven at 140° F. where the water within the particles is vaporized by the heat. During the drying process the water-logged material shrinks as the water is removed to final dimensions determined by the dimensions of the preformed nitrocellulose solution bodies and the concentration of nitrocellulose in the original alkoxy alcohol solution. In the final dry condition the nitrocellulose material is in the form of hard, tough, nonporous, fully colloided particles or granules which retain substantially the physical shape of the shock-gelled bodies subjected to leaching.

Although conventional air drying, as set forth above, is effective in removing the water from the water-logged particles, there are certain disadvantages in air drying the particles. The principal disadvantage is that the resulting air dried casting powder particles or granules frequently produce cast double base propellants which, based on present specifications, have unacceptable shelf life and/or unacceptable physical properties. Additionally, there is often a significant amount of waste caused as a result of the adhesion of powder granules to each other during drying. Furthermore, the drying period is excessively long even at elevated temperatures.

Accordingly, it is an object of the present invention to provide an improved shock-gelling method for preparation of casting powders which overcomes the disadvantages of the customary shock-gel process of manufacture.

Another object of the invention is to provide an improved method for removal of water from the water-logged gel pellets or particles obtained during the shock-gel method of manufacture of casting powders.

A further object of the invention is to provide a method for preparation of casting powders of improved uniformity and improved freedom from contaminants.

A still further object of the invention is to provide shock-gelled casting powder granules of improved properties which when cast into double base propellant will consistently meet established performance specifications for such double base propellants.

Generally described, the objectives and others are accomplished in accordance with this invention by subjecting the water-logged nitrocellulose gel particles resulting upon completion of leaching to a freezing atmosphere while simultaneously regulating conditions of heat transfer to cause water to exude in liquid form from the water-logged nitrocellulose particles and to freeze on the outside of said nitrocellulose particles until substantially less than 1% by weight of water remains in said nitrocellulose particles, after which frozen water on the outside of the nitrocellulose particles is removed, preferably by flushing off the surface ice with water and then evaporating the surface film of water remaining after the flushing operation. For convenience hereinafter the process of removing water from the water-logged nitrocellulose particles in accordance with this invention as set forth hereinabove is termed "cold temperature exudation."

Removal of water by cold temperature exudation is characterized by the fact that the water in the water-logged particles exudes in liquid form from the particles and freezes on the outer surface of the particles in fine featherlike ice crystals which are readily removed by flushing with water. During cold temperature exudation the shock-gelled particles of nitrocellulose shrink uniformly as water is exuded to final dimensions determined by the dimensions of the preformed nitrocelulose solution bodies and the original concentration of nitrocellulose in the alkoxy alcohol solution; and upon completion of water removal by cold temperature exudation, the nitrocellulose material is in the form of hard, tough, nonporous, fully colloided particles which retain substantially the physical shape of the shock-gelled bodies of material subjected to leaching.

Removal of water by cold temperature exudation in accordance with this invention is rapid, irreversible, and substantially quantitative. Under optimum conditions water content in the particles is reduced by cold temperature exudation to substantially less than 1% by weight within 20 minutes. Accordingly, upon completion of water removal by cold temperature exudation, the interior of the particles is substantially in a final dry condition, since the process of syneresis which the water-logged particles undergo during cold temperature exudation of water is irreversible, and water from outside the particles cannot diffuse back into them. Hence, flushing off the fine, featherlike ice crystals from the outer surface of the nitrocellulose particles with water has substantially no effect to reintroduce water into the particles, and simple evaporation of the surface film of water remaining on the outside of the particles after flushing produces dry casting powder granules ready for use.

It is presently believed that the improved properties of shock-gel casting powder granules dried by low temperature exudation are directly attributable to the fact that small amounts of residual alkoxy alcohol or other water-soluble impurities, which, if allowed to remain in the particles would deleteriously affect the stabiltiy of the material, are removed from the powder granules dissolved in the water which exudes in liquid form during low temperature exudation drying. Such impurities remain in the casting powder granules when the particles are dried by conventional hot air drying methods.

In accordance with one embodiment of the invention, casting powder granules are produced by dissolving nitrocellulose, with or without the addition of various smokeless powder adjuvants such as stabilizers, plasticizers, and the like, in a water-miscible alkoxy alcohol, such as diethylene glycol, to form a suitable solution which is then preformed as desired into spheroidal droplets, strands, and the like, after which the preformed bodies of nitrocellulose solution are introduced into a water bath containing at the point of initial contact not more than 90% by weight of water-miscible alkoxy alcohol to shock-gel the preformed nitrocellulose bodies. The shock-gelled particles are then subjected to leaching in a water bath with a continuous supply of fresh water until the water-miscible alkoxy alcohol originally contained in the particles is substantially replaced by water. At the termination of leaching, the water-logged particles are then subjected to a freezing atmosphere which induces rapid syneresis of the shock-gelled, water-logged particles, and water within the particles exudes rapidly and substantially quantitatively in liquid form from the water-logged particles and is frozen into fine featherlike ice crystals on the outer surface of the particles. Heat transfer conditions are regulated during cold temperature exudation to cause the water to exude in liquid form and to avoid freezing of the water inside the water-logged particles, for such freezing defeats the purposes of this invention. This is because if water freezes inside the particles, normal and expected shrinkage of the gel is prevented. Moreover, such water can then be removed only by conventional drying methods, resulting in porous particles of low density and poor physical properties.

Upon completiton of low temperature exudation, the powder granules are removed from the cold atmosphere and flushed with water to remove the ice. This is a relatively short operation, since the ice formation resembles fluffy snow and is quickly melted. The surface film of water remaining on the particles after flushing is then evaporated therefrom, after which the powder granules are glazed with graphite and are ready for use as casting powder granules in manufacture of cast double base propellant grains.

Having generally described the invention, the following examples set forth some specific embodiments of the invention. It is to be understood, however, that these examples, while illustrative, are not to be construed as a limitation of the invention.

EXAMPLE 1

A solution was prepared containing the following ingredients:

| | Parts by Weight |
|---|---|
| Nitrocellulose having a nitrogen content of 12.6% by weight and a standard ASTM falling ball viscosity characteristic of 18 to 20 seconds | 9.1 |
| 2-nitrodiphenylamine | 0.2 |
| Dioctylphthalate | 0.4 |
| Lead stearate | 0.3 |
| Diethylene glycol having less than 0.3% water by weight | 90.0 |

This solution was poured into a metal container, the bottom of which contained perforations approximately 0.031 inch in diameter, and upon flowing through the perforations, formed droplets which were allowed to fall about 18 inches through air before striking the surface of a water bath. During this fall the droplets became substantially spherical in shape. The surfaces of the spheroidal droplets gelled instantly upon contact with the water bath, and the shock-gelled spheroids thus formed were sufficiently tough to withstand passage through the water bath surface and into the bath without substantial deformation. The shock-gelled balls thus produced were leached in running water for a period of about 2 hours, at the end of which time substantially all diethylene glycol had been leached from the balls and had been replaced by water. The water-logged balls upon completion of the leaching operation contained approximately 95% by weight of water and were approximately 0.080 inch in diameter.

These water-logged balls were then placed in wood trays measuring 32 inches long, 15 inches wide and 2.25 inches deep, having cheesecloth over ½ inch mesh wire bottoms, the layer of water-logged balls in each tray being ¼ inch deep. The loaded trays, separated from each other with 1-inch separators, were stacked in a convection cooled refrigerator maintained at −10° F. and allowed to remain in the freezing atmosphere of the refrigerator for 16 hours. During this exposure to a freezing atmosphere, substantially all of the water exuded in liquid form from the water-logged balls and was frozen on the outer surfaces thereof as fine featherlike ice crystals, the balls shrinking in size as the water exuded to a final size approximately 0.030 inch in diameter. After 16 hours, the trays, now containing pellets essentially dry interiorly with fine featherlike ice crystals on their outer surfaces, were removed from the refrigerator and were flushed with ambient temperature water for 2 minutes to remove the ice. The trays containing the flushed pellets were placed in a forced circulation hot air oven at 140° F. for 2 hours to remove the residual film of flushing water on the surfaces of the pellets.

The resulting casting powder granules were found by analysis to contain less than 1% water by weight and were uniformly sized spheroidal particles approximately 0.030 inch in diameter, being uniformly hard, tough, fully colloided, and substantially free of porosity.

EXAMPLE 2

In order to illustrate the improved quality of casting powder granules dried by low temperature exudation in comparison to casting powder granules of the same composition dried by conventional hot air methods, five replicate lots of the same nitrocellulose solution set forth in Example 1 were shock-gelled and leached substantially as set forth in Example 1. After leaching, each replicate lot of shock-gelled water-logged particles was divided into two approximately equal parts. One part of each replicate lot was then dried by low temperature exudation in the following manner:

The water-logged particles were placed in the same trays employed in Example 1, the layer of water-logged particles in each tray being ½ inch thick. Each tray was then covered with a canvas tarpaulin, and the loaded, covered trays, separated from each other with 1-inch separators, were stacked in a forced circulation air cooled refrigerator maintained at −10° F. and allowed to remain in the freezing atmosphere of the refrigerator for 120 hours. After 120 hours in the refrigerator, the trays were removed from the refrigerator, uncovered, and the ice-covered particles on the trays were flushed with ambient temperature water for 2 minutes to remove ice and dried in a forced circulation hot air oven at 140° F. for 2 hours. All lots of granules thus dried contained less than 1% water by weight.

The remaining part of each replicate lot of water-logged particles was dried by the conventional hot air method by placing trays containing ½ inch layers of the water-logged particles in a forced circulation hot air oven maintained at 140° F. for 120 hours. At the end of this time the particles of all lots contained less than 1% water by weight.

Cast double base propellant grains were then prepared from all samples of cold temperature exudation dried, as well as conventionally air dried, casting powders, after glazing with graphite, as follows:

One pound of dry casting powder was loaded into a tubular cellulose acetate beaker 12 inches long having an inside diameter of 1.980 inches and an outside diameter of 2.000 inches, closed at the bottom end with a rubber stopper fitted with a glass nipple to which a casting liquid line was attached. A fine screen rested on the rubber stopper inside the beaker to retain the casting powder granules out of contact with the rubber stopper. The casting powder formed a column 10 inches high in the beaker. Casting liquid was then introduced into the loaded beaker until the column of casting powder was completely immersed and the level of casting liquid was ¼ inch above the column of casting powder. The casting liquid line was then closed off, and the loaded beaker was placed in a pressure chamber at 140° F. and 30 p.s.i.g. air pressure for 72 hours to cure the propellant grain.

The composition of the casting liquid employed for all samples was as follows:

| | Percent by weight |
|---|---|
| Nitroglycerin | 72 |
| Triacetin | 27 |
| 2-nitrodiphenylamine | 1 |

Upon completion of the curing cycle, the cured propellant grain was removed from the pressure chamber, the rubber stopper and screen were removed, the grain was trimmed and was evaluated for tensile strength and elongation and for stability to heat.

For tensile strength and elongation tests, two dumbbell-shaped specimens, 4 inches in length, cylindrical in cross section, 1 inch in diameter at the ends, with a necked-down intermediate portion 3 inches long and ½ inch in diameter, were machined from each propellant grain. These dumbbell specimens were then subjected to conventional tensile strength and elongation tests according to specification No. SPIA PP8 (Solid Propellant Information Agency).

For heat stability, portions of each propellant grain, finely ground to about 10 mesh particles, were subjected to the standard Taliani stability test, according to specification No. Navord 7904 (Naval Ordnance), in which 1 gram of material in a nitrogen atmosphere in a pressure bulb of 8 cc. capacity, connected to a mercury manometer, is placed in a heating block maintained at 110° C. Pressure developed in the pressure bulb as a result of decomposition gas evolution from the material is plotted as a function of time. Time in minutes for the pressure in the pressure bulb to reach a value equivalent to a column of mercury 100 mm. in height and the slope of the pressure-time curve at 100 mm. of pressure are recorded. Table I following sets forth the significant tensile strength and elongation data, and also the Taliani stability data for all propellant grains tested.

It can be seen from these data that all double base propellant grains derived from shock-gel casting powders dried by low temperature exudation satisfactorily met all specification requirements for tensile strength, elongation and Taliani stability. In contrast to the uniformly satisfactory performance of propellant grains derived from cold temperature exudation dried shock-gel casting powders, propellant grains derived from conventionally hot air dried shock-gel casting powders failed to meet specification tensile strength in 3 out of 5 replicates, failed to meet specification elongation in 5 out of 5 replicates, and failed to meet Taliani stability in 3 out of 5 replicates. Accordingly, it can be seen from these data that cold temperature exudation drying of shock-gel casting powders produced a significant increase in cast propellant physical and stability property values in comparison to conventional hot air drying. The higher values obtained as a result of cold temperature exudation drying are indicative of improved cast propellant storage life and also indicate a reduced probability of grain breakup during actual unit firings.

EXAMPLE 3

The same nitrocellulose solution set forth in Example 1 was shock-gelled and leached substantially as set forth in Example 1. After leaching, the water-logged spheroids were dried by low temperature exudation in the following manner:

The water-logged spheroids were spread in the same wooden trays employed for Example 1 in layers 1 inch deep, each tray was covered with a canvas tarpaulin, and the loaded, covered trays, separated from each other with 1-inch separators, were stacked in a forced circulation air cooled refrigerator maintained at −30° F. for 48 hours. The powder granules were then deiced and air dried for 2 hours at 140° F. by the same procedure employed in Example 1. The resulting casting powder contained substantially less than 1% by weight of water and was substantially the same as the casting powder produced by Example 1, being uniformly hard, tough, fully colloided spheroids substantially free of porosity. The resulting casting powder formed double base propellant grains which satisfactorily met specification requirements for strength and heat stability tests as set forth in Example 2.

EXAMPLE 4

In order to determine the effect of temperature, the following experiments were performed.

The same nitrocellulose solution employed in Example 1 was shock-gelled and leached substantially as set forth in Example 1. After leaching, the water-logged pellets were divided into several portions, and the pellets of each

*Table I*

COMPARISON OF STRENGTH AND HEAT STABILITY PROPERTIES OF DOUBLE BASE PROPELLANT GRAINS PREPARED FROM SHOCK GEL CASTING POWDER DRIED BY COLD TEMPERATURE EXUDATION AND FROM SHOCK-GEL CASTING POWDER DRIED BY CONVENTIONAL HOT AIR DRYING.

| Shock-Gel Casting Powder Replicate Lot No. | Method of Drying | Tensile Strength (lb./sq. in.) | Elongation Percent | Taliani Stability | |
|---|---|---|---|---|---|
| | | | | Slope of Pressure-Time Curve at Pressure Equal to 100 mm. Mercury | Time to Develop Pressure Equal to 100 mm. of Mercury (Minutes) |
| 1 | Hot air | 300 | 9.6 | 2.56 | 39 |
| | Cold temp. exud | 980 | 20.3 | 0.93 | 108 |
| 2 | Hot air | 985 | 13.2 | 0.78 | 128 |
| | Cold temp. exud | 820 | 34.7 | 0.56 | 178 |
| 3 | Hot air | 1,010 | 15.2 | 0.42 | 238 |
| | Cold temp. exud | 970 | 21.2 | 0.71 | 140 |
| 4 | Hot air | 680 | 19.2 | 1.19 | 84 |
| | Cold temp. exud | 920 | 33.3 | 0.66 | 152 |
| 5 | Hot air | 425 | 10.0 | 2.13 | 47 |
| | Cold temp. exud | 805 | 20.6 | 0.87 | 115 |
| Specification Values | | Equal to or greater than 800. | Equal to or greater than 20.0. | Less than 1.00. | Greater than 100. | portion were randomly spaced on a wire screen so that the individual pellets were about 1/16 to 1/4 inch apart.

Each portion was then subjected to an air atmosphere at a different temperature, and the following observations were made:

At temperatures above 32° F., satisfactory syneresis of the water-logged pellets did not take place and water was not satisfactorily removed from the pellets by exudation.

At temperatures between 28° F. and 32° F., inclusive, satisfactory syneresis of the water-logged pellets occurred and water was substantially removed from the pellets by cold temperature exudation within about 20 minutes to a level below 1% by weight, the water exuding in liquid form from the pellets and freezing on the surface thereof as fine, featherlike ice crystals. The completion of water removal was determined by visual observation of the size of the pellets in comparison with pellets known to be dry. The resulting casting powder granules, after ice removal by flushing with water and then drying off the film of flushing water as set forth in Example 1, were substantially the same in physical structure and properties as casting powder prepared in accordance with Example 1. Double base propellant grains prepared from the resulting casting powders satisfactorily met specification strength and heat stability requirements.

At temperatures below 28° F., water froze within the water-logged pellets preventing cold temperature exudation in accordance with this invention and also preventing normal and expected shrinkage of the pellets during exposure to the freezing atmosphere. Water frozen within the pellets at temperatures below 28° F. could only be removed by conventional evaporation methods, resulting in porous particles of low density, poor physical properties, and unsatisfactory performance with respect to specification requirements when cast into double base propellant grains.

A preferred embodiment of this invention for drying the water-logged gel particles by cold temperature exudation involves subjecting said particles in a thin layer approximately one particle deep to a freezing atmosphere maintained at a temperature between about 28° and 32° F. until substantially less than 1% by weight of water remains in said particles, said water exuding in liquid form from the gel particles and freezing on the outside surfaces thereof in fine, featherlike ice crystals and thereafter deicing the particles by flushing with water and evaporating off the surface film of flushing water. A convenient means for practicing this invention continuously involves continuously spreading the water-logged gel particles in a thin layer approximately one particle deep on a continuously moving conveyor, such as an endless belt, continuously advancing the layer of water-logged gel particles into and through an atmospheric freezing zone maintained at a temperature between about 28° F. and 32° F. to cause water to exude in liquid form from said water-logged gel particles and to freeze on the outer surfaces thereof in the form of fine frostlike ice crystals, adjusting residence time of the water-logged gel particles in the freezing zone to effect substantial exudation of water from said particles until substantially less than 1% by weight of water remains in said gel particles, continuously advancing the resulting particles from the freezing zone into a deicing zone in which the frostlike ice crystals are flushed off with water, after which the resulting flushed particles are continuously advanced through an evaporation zone to evaporate the surface film of flushing water to produce substantially dry granules of nitrocellulose casting powder.

Satisfactory drying of shock-gel casting powder by cold temperature exudation requires that the water-logged pellets, upon completion of leaching, be subjected to a freezing atmosphere under regulated conditions of heat transfer. A freezing atmosphere is required, since temperatures above the freezing point of water are not effective in inducing satisfactory syneresis of the water-logged nitrocellulose gel. The rate of heat transfer must be regulated so that freezing of the water in the gel is avoided, for if the water freezes within the gel particles, it cannot be removed by cold temperature exudation, and conventional evaporation methods must then be resorted to, resulting in porous granules having unsatisfactory properties and performance characteristics. Experience shows that several factors influence the rate of heat transfer, the more important being the temperature level of the refrigerating equipment, the thickness of the layer of water-logged pellets, the heat removal capacity of the refrigerating equipment, and insulation of the water-logged material. In the examples, employing water-logged pellets 0.080 inch in diameter, it was demonstrated that isolated pellets require temperatures between about 28° F. and 32° F. for satisfactory low temperature exudation drying. However, layers of the same water-logged pellets 1/4 inch thick were satisfactorily dried by low temperature exudation at temperatures as low as −10° F. and layers of the same water-logged pellets 1 inch thick, insulated by covering with a canvas tarpaulin, were satisfactorily dried by low temperature exudation at temperatures as low as −30° F. One skilled in the are will appreciate, therefore, that there are numerous possible satisfactory combinations of the several factors influencing heat transfer and will, accordingly, select a set of conditions which will induce active syneresis of the water-logged gel particles so that water is exuded in liquid form from the particles and freezes in fine, featherlike ice crystals on the outside surfaces of the particles and so that freezing of water inside the gel particles is avoided.

Visual observation of the water-logged gel particles during subjection to a freezing atmosphere provides a simple expedient for determining whether heat transfer conditions are satisfactorily regulated to accomplish the purposes of this invention. When heat transfer conditions are satisfactorily regulated, the gel particles will be observed to shrink continuously and uniformly in size with continued exposure until the particles reach their final fully shrunken, nonporous state which is readily ascertainable by comparison with particles known to be satisfactorily dry. Moisture content of such particles, after deicing, and evaporation of the surface film of flushing water will be found to be substantialy less than 1%, and the density will be found to correspond to the fully densified, nonporous state of the composition. On the other hand, if heat transfer conditions are too severe so that water freezes inside the gel particles, the particles will be observed to remain relatively stationary in size with continued exposure, remaining much larger than their expected final fully shrunken, nonporous state. Moisture content of such particles, after deicing and evaporation of the surface film of flushing water, will be found to be substantially greater than 1% by weight and upon drying to a moisture content below 1%, the density will be found to correspond to a porous state of the composition.

Any nitrocellulose having a degree of substitution corresponding to a nitrogen content of 11.3% or more by weight is suitable in accordance with this invention, the theoretical upper limit, of course, being cellulose trinitrate with a nitrogen content of 14.14% by weight. Practice of this invention requires a nitrocellulose with a nitrogen content of at least 11.3% by weight, since nitrocelluloses having less than 11.3% nitrogen by weight do not shock-gel properly from solution in alkoxy alcohol. There is no limitation with respect to the viscosity characteristic of the nitrocellulose employed, and all commercially available viscosity types of nitrocellulose, ranging in viscosities from 10 cps. to 377,000 cps. (1000-second type) in 12.2% solution in a solvent composed of 20% ethyl acetate, 25% ethyl alcohol, and 55% benzene, by weight, are suitable for practice of this invention.

Any liquid, water-soluble alkoxy alcohol is suitable for the purposes of this invention and include, by way of example, without limitation, diethylene glycol, triethylene glycol, polyethylene glycol, dipropylene glycol, polypropylene glycol, polymethylene glycol, ethylene glycol monomethyl ether (methoxyethanol), diethylene glycol monomethyl ether, glyceryl-α-allyl ether and glyceryl-α-methyl ether. Mixtures of alkoxy alcohols may also be employed and in some cases are preferred.

In view of the well-known fact that the solubility characteristics of nitrocellulose depend to a large degree upon the degree of substitution or esterification, as expressed by the nitrogen content of the nitrocellulose, it will be appreciated that all operable nitrocelluloses cannot be dissolved in every one of the alkoxy alcohols to the same concentration, and in most instances nitrocellulose is not soluble in one particular solvent throughout the entire range of nitrogen substitution. However, the solubility of a particular grade of nitrocellulose in a particular solvent is a strictly physical phenomenon and the selection of solvent or solvent mixture to be employed in the present invention is a routine matter. In Table II following, data are presented showing alkoxy alcohols or mixtures thereof in which the indicated nitrocellulose was dissolved and the resulting solutions were shock-gelled, leached and dried in accordance with this invention to produce satisfactory casting powders. The table does not represent limits of solubility but instead preferred alkoxy alcohols for nitrocellulose of specific nitrogen content expressed in percent by weight.

Table II

| Solvent | Percent Nitrogen by Weight in Nitrocellulose | | | | | | |
|---|---|---|---|---|---|---|---|
| | 11.3 | 11.8 | 12.1 | 12.6 | 13.2 | 13.4 | 13.9 |
| Glyceryl-α-allyl ether | x | x | x | x | | | |
| Glyceryl-α-methyl ether | | | x | x | | | |
| Diethylene glycol | | | x | x | | | |
| Polyethylene glycol | | | | x | x | x | |
| Dipropylene glycol | | | | x | | | |
| Polypropylene glycol | | x | x | | | | |
| Methoxyethanol | | | | | | x | x |
| Diethylene glycol monomethyl ether | | | | | | x | |
| Mixtures of diethylene glycol monomethyl ether and diethylene glycol | | | | | x | | |
| Mixtures of diethylene glycol monomethyl ether and glyceryl-α-allyl ether | | | | | x | x | x |

Of all the alkoxy alcohols, diethylene glycol is preferred, especially when employed with nitrocellulose having a nitrogen content between about 12% and about 13% by weight.

The solution of nitrocellulose in alkoxy alcohol may be preformed for introduction into the gelling bath in a number of ways, depending largely upon the shape and size of the particles desired. When very small particles of nitrocellulose composition on the order of 100 microns or less in size are desired, it is most convenient to atomize the solution from a suitable spray nozzle or orifice to form a spray of minute droplets, and the droplets thus formed are allowed to fall into the gelling bath. If desired, the spray droplets may first be allowed to fall through a mist of the gelling medium to initiate gelation. When the alkoxy alcohol solution of nitrocellulose is preformed by atomizing from a spray nozzle or orifice, the viscosity of the solution obviously must be adjusted to a level which can be suitably atomized by spraying, as is well recognized by those skilled in the art.

It will be apparent, of course, that the viscosity of the alkoxy alcohol solution of nitrocellulose will depend both upon the viscosity characteristic of the nitrocellulose employed as well as the amount of nitrocellulose which is dissolved in the alkoxy alcohol. It follows, therefore, that for any desired solution viscosity, the amount of nitrocellulose necessary to produce that desired viscosity will decrease as the viscosity characteristic of the nitrocellulose increases. It also follows that with any selected nitrocellulose, the viscosity of the solution will increase with increasing amount of nitrocellulose dissolved therein. The art is fully cognizant of these relationships.

In another embodiment of the invention, the solution of nitrocellulose in alkoxy alcohol is formed into droplets of the desired size by passage through a perforated plate. In practicing this embodiment, the diameter of the perforations and the viscosity of the alkoxy alcohol solution of nitrocellulose are selected so that the solution upon flowing through the perforations breaks up and forms individual drops instead of flowing in unbroken streams from the orifice. The droplets thus formed are preferably allowed to fall freely until they assume a spherical or spheroidal configuration prior to contacting the gelling bath. Upon striking the surface of the bath, the gelation of the surface of such particles is so rapid that no substantial distortion occurs. By this embodiment small, dense, spheroidal balls of fully colloided nitrocellulose are produced which are larger than can be produced by spraying methods. By proper selection of orifice size and solution concentration and viscosity, production of uniformly sized spheroidal particles can be obtained in any desired size from as small as 0.01 inch diameter or less to ¼ inch diameter or more. When employing either the spray or freely falling droplet techniques, a nitrocellulose concentration in the alkoxy alcohol solution of between about 1% and about 10% will be employed, preferably between about 2% and about 10% by weight.

Instead of preforming the alkoxy alcohol solution of nitrocellulose into droplets or spray particles, the solution may be introduced into the gelling bath as a continuous stream by gravity or low pressure extrusion of the solution through suitable perforations or orifices. In accordance with this technique, an alkoxy alcohol solution of nitrocellulose, preferably characterized by a nitrocellulose concentration of between about 2% and about 20% by weight, is preformed by causing it to flow through one or more orifices of the desired size in an unbroken stream into the gelling bath. The resulting gelled material will be cordlike and can be leached in this form, after which the water-logged cord can be cut into any granulation desired before drying by low temperature exudation.

In yet another embodiment of the invention, an alkoxy alcohol solution of nitrocellulose can be produced which contains from about 20% to about 50% or more by weight f nitrocellulose. Such solutions are stiff pastes and must be preformed by pressure extrusion techniques comparable to extrusion techniques employed in the celluloid art or in the solvent process for manufacture of smokeless powder. By this technique the stiff paste-like solution of nitrocellulose is preformed by pressure extrusion through a die of any desired cross-sectional area and configuration, and the extruded shape is introduced into the water bath for gelation and removal of alkoxy alcohol by leaching. In this technique the pressure-extruded shape may be cut into predetermined lengths prior to introduction into the gelling bath, after gelation, or after leaching as convenient or desired.

From the foregoing description, it will be seen that the concentration of nitrocellulose in alkoxy alcohol solution is largely a matter of choice and convenience, depending somewhat, of course, on the method of preforming which is selected and the size and shape of the particles or granules desired. A factor to be considered at the lower end of concentration will be the physical strength of the shock-gelled material. In general, concentrations much under 2% by weight of nitrocellulose will be found to be somewhat tender to handle properly for processing. Factors to be considered at the upper end of concentration include viscosity, castability, extrusion pressure, ease of droplet formation, and the like. For most practical purposes, as mch as 50% or more by weight of nitrocelluloses of the lower viscosity characteristics, such as ¼ second and ½ second types, can be employed and about 30 to 40% of nitrocelluloses of the higher viscosity characteristics, such as plastic type nitrocellulose.

Shock-gelling is usually done with an aqueous bath at room temperature, although higher or lower temperatures may be employed if desired. Excellent shock gels have been prepared using an ice water bath. The composition of the shock-gelling bath will be either straight water or water containing up to and including about 90% by weight of one or a mixture of the alkoxy alcohols which are operative as nitrocellulose solvents in accordance with this invention.

Conventional additives to nitrocellulose and smokeless powder compositions may be added at various points in the process without detracting from the method as hereinabove set forth. For example, nitrocellulose plasticizers and other additives such as stabilizers and ballistic modifiers for the nitrocellulose may be incorporated into the original alkoxy alcohol solution so that after shock-gelling, leaching and drying according to this invention a finished, fully colloided casting powder is obtained in which the plasticizers and/or other additives are uniformly incorporated. Similarly, pigments or other insoluble material may be uniformly incorporated into the nitrocellulose composition by adding such materials to the original alkoxy alcohol solution prior to shock-gelling, leaching and drying by low temperature exudation.

Alternatively, plasticizers and the like may be introduced into the nitrocellulose composition after shock-gelling and extraction of the alkoxy alcohol in the leaching bath by contacting the water-logged nitrocellulose material with an aqueous solution, suspension or emulsion of the plasticizer or additive for a period necessary to obtain the desired degree of absorption. While in the water-logged condition, the nitrocellulose can be saturated with salts, or other solutions and compounds may be deposited in the particles by means of metathetical reactions prior to drying by low temperature exudation drying.

Drying by cold temperature exudation in accordance with this invention is versatile in that any type of casting powder formula made by the shock-gel process can be dried by this method. Typical casting powder compositions, in addition to the composition set forth in Examples 1 to 4, that have been dried by cold temperature exudation include the following:

| Ingredients | Composition, Parts by Weight | | |
|---|---|---|---|
| Nitrocellulose | 89 | 91 | 88 |
| Dinitrotoluene | 10 | 3 | |
| 2-Nirodiphenylamine | | 1 | 2 |
| Ethyl centralite | 1 | | |
| Dioctyl phthalate | | | 5 |
| Lead stearate | | 5 | 5 |
| Carbon black | 0.2 | 0.2 | |

It is evident from the foregoing description that drying of shock-gel casting powder compositions by low temperature exudation provides an eminently satisfactory method for removing water from the water-logged gel particles produced during manufacture of casting powders by the shock-gel method, having distinct advantages over prior art methods of drying such particles by conventional evaporation methods. The principal advantages of the invention reside in the attainment of the objectives as set forth hereinabove. Of first importance is the demonstrated fact that casting powders dried by cold temperature exudation produce cast double base propellant grains of markedly improved quality, which can consistently be relied upon to satisfactorily meet specification requirements for tensile strength and elongation and heat stability, these properties being reliable indications of improved cast propellant storage life and reduced probability of grain breakup during firing. In contrast, casting powders dried by conventional evaporation methods produce cast double base propellant grains which cannot be consistently relied upon to meet specification requirements for tensile strength and elongation and heat stability. Moreover, shock-gel casting powder granules can be satisfactorily dried by cold temperature exudation in much less time than shock-gel casting powder granules dried by conventional evaporation methods. Furthermore, waste resulting from granules sticking together during the drying operation is avoided by cold temperature exudation drying.

What I claim and desire to protect by Letters Patent is:

1. A process for producing substantially dry, fully colloided, nonporous nitrocellulose casting powder granules which comprises forming a solution by dissolving nitrocellulose having a degree of substitution corresponding to a nitrogen content of at least 11.3% by weight in water-soluble alkoxy alcohol, preforming the resulting solution into shaped bodies, introducing the shaped bodies of preformed solution into a water bath containing at the point of initial contact not more than 90% by weight of water-miscible alkoxy alcohol to shock-gel said shaped bodies by rapidly forming a tough envelope of gelled nitrocellulose on the surfaces of said bodies so that said bodies retain their preformed shape, leaching the resulting shock-gelled bodies in the presence of additional water until substantially all of the alkoxy alcohol therein has been replaced by water to form water-logged gel particles, subjecting the water-logged gel particles to syneresis in a freezing atmosphere to cause water to exude in liquid form from the water-logged gel particles and to freeze on the outer surface of said particles until substantially less than 1% by weight of water remains in the nitrocellulose particles, and thereafter removing the frozen water from the outside of the particles.

2. The process in accordance with claim 1 in which the frozen water is removed by flushing the ice-coated particles with water and then evaporating the film of water remaining on the surface of the particles after flushing.

3. The process in accordance with claim 1 in which the alkoxy alcohol is diethylene glycol.

4. The process in accordance with claim 1 in which the water-logged gel particles are subjected in a layer approximately one particle deep to a freezing atmosphere maintained at a temperature between about 28° F. and about 32° F. until substantially less than 1% by weight of water remains in said nitrocellulose particles.

5. The process in accordance with claim 4 in which the water-logged gel particles are continuously advanced successively in order through a freezing zone, a deicing zone and an evaporation zone to produce substantially dry casting powder granules.

6. The process in accordance with claim 1 in which the solution is preformed by passing through perforations to form droplets and the droplets thus formed are allowed to fall into the gelling bath.

7. The process in accordance with claim 1 in which the solution is preformed by spray atomization, and the atomized spray particles are introduced into the gelling bath.

8. The process in accordance with claim 1 in which the solution is preformed by extrusion through an orifice to form a strand, and the strand is introduced into the gelling bath.

References Cited in the file of this patent

UNITED STATES PATENTS

| | | |
|---|---|---|
| 1,633,927 | Davidson | June 28, 1927 |
| 1,746,543 | Lowry | Feb. 11, 1930 |
| 2,118,506 | Graves | May 24, 1938 |
| 2,446,075 | Blair | July 27, 1948 |